May 31, 1938.  B. F. HARTWELL ET AL  2,119,274
MOLDED COUNTER AND UNMOLDED QUARTER FOR BOOTS
AND SHOES, AND METHOD OF MAKING SAME
Filed June 3, 1937  2 Sheets-Sheet 1

Inventors
Benjamin F. Hartwell
Leslie L. Hartwell Jr
Arthur F. Hartwell
by James R. Hodder
Attorney

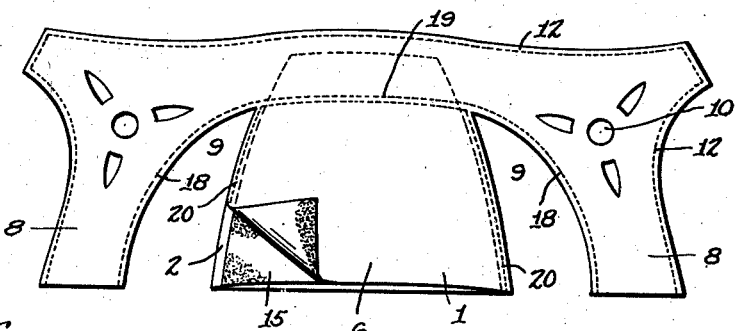
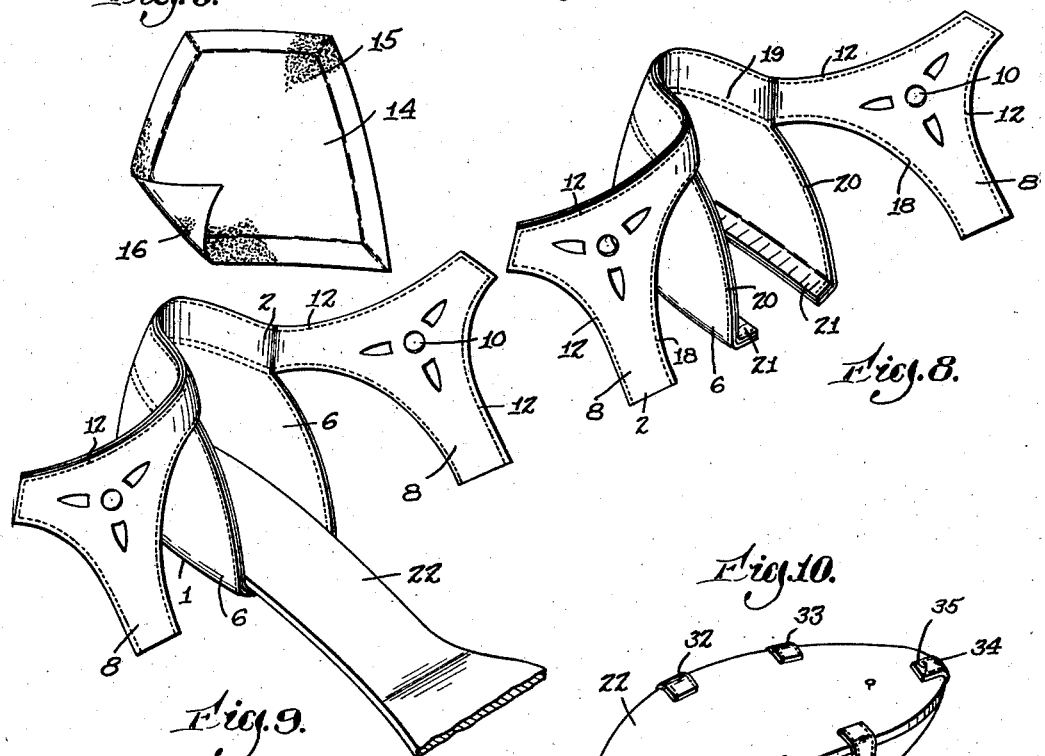
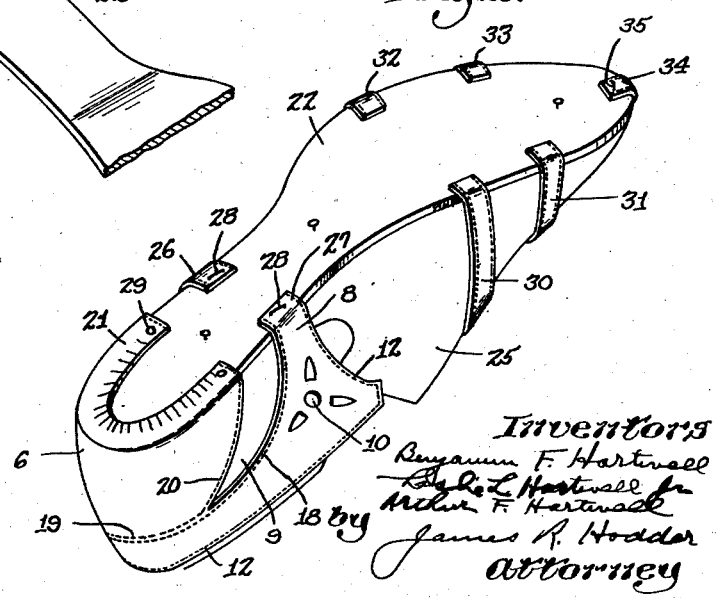

Patented May 31, 1938

2,119,274

UNITED STATES PATENT OFFICE 2,119,274

MOLDED COUNTER AND UNMOLDED QUARTER FOR BOOTS AND SHOES, AND METHOD OF MAKING SAME

Benjamin F. Hartwell, Leslie L. Hartwell, Jr., and Arthur F. Hartwell, Bellows Falls, Vt.

Application June 3, 1937, Serial No. 146,216

2 Claims. (Cl. 36—11.5)

In our development of the novel process of making boots and shoes as described and claimed in our prior and copending applications Ser. No. 104,196, filed Oct. 6, 1936, and Ser. No. 137,708, filed April 19, 1937, and Ser. No. 146,217 filed June 3, 1937, we have discovered novel, simple, and efficient methods for the formation of a counter and quarter of a shoe wherein the upper, lining, and counter stiffener are assembled while flat, and then simultaneously molded into final form, with a molded flange suitable for attachment to the heel part of an insole, all prior to assembling on a last, and eliminating the usual heel-lasting operations.

In our present invention we have discovered an improved method of making the counter and quarter portions for the shoe, wherein the counter portion only may be fitted with the counter stiffener and molded, and with the quarter portions unmolded.

In carrying out our present invention we preferably form an entire blank of both the upper material and lining of a suitable size to constitute both the molded counter part and the unmolded quarter sections, and thereupon cut or die out the predetermined design from such blank, forming the same on lines of cut which will separate the part to constitute the molded counter portion from that part which constitutes the unmolded quarter portion, together with any other cut-out designs desired, which are formed or cut simultaneously in the blank, utilizing well known cutting-out machines for this purpose.

Thereupon stitching is applied around the marginal edge to unite the lining and upper and to present a finished appearance. The counter stiffener is applied to the counter portion between the stitched and united upper and lining, and thereupon the counter portion of the blank thus formed is subjected to a counter-molding and flanging operation, simultaneously molding the upper, lining, and counter stiffener into the final form desired for the counter, and with the inturned flange to be applied to the counter part of the insole.

This greatly facilitates the assembly of the counter and quarter blank onto a last either before or after the insole is attached thereto, whereupon the heel seat is thus practically preformed, and the quarter portions, which are free of the molding and preforming operations, are lasted and secured to the insole by cement, staples, lasting tacks, or in any other manner desired.

Our present method of preforming a counter portion by molding and then lasting the fore portion or quarters all from the same blank constitutes, we believe, a distinct novelty in this art and is an improvement which greatly facilitates the speed of operation and fitting, as well as finishing of a high-grade boot and shoe structure.

By this method we obtain the advantages of our prior molding and nailless heel seat construction, wherein the upper and insole may be united prior to assembly on a last, together with the benefits and advantages incident to lasting the forward portions of the quarter after assembly on a last, thus enabling the quarter to be stretched and pulled firmly onto the wood of the last to insure better fitting of same, and all preferably from a single blank from which both the counter portion and the quarters are died-out, leaving each independent, one for the molding and flanging, and one for pulling-over and lasting.

Referring to the drawings illustrating a preferred embodiment of our present invention, Fig. 1 illustrates an upper blank died-out from leather, suede, fabric, satin, or other material suitable for use in carrying out our present invention;

Fig. 6 illustrates a counter stiffener to be fitted into the counter portion prior to molding;

Fig. 7 shows the counter stiffener assembled in the counter section while the layers are flat, and with finishing stitching applied around the marginal edges of the upper not previously stitched and which hold the counter stiffener in place;

Fig. 8 illustrates the counter-molding portion after it has been molded into the finished contour of the counter and heel seat structure;

Fig. 9 illustrates the upper and molded heel seat attached to the insole;

Fig. 10 shows the molded counter and attached insole assembled on a last and the unmolded quarters then lasted, together with a lasted forepart to complete the shoe or sandal.

Figure 1:
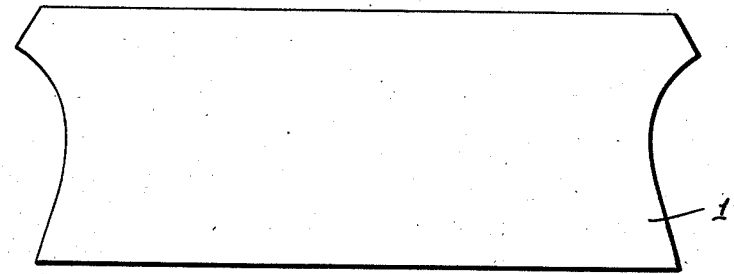
Figure 2:
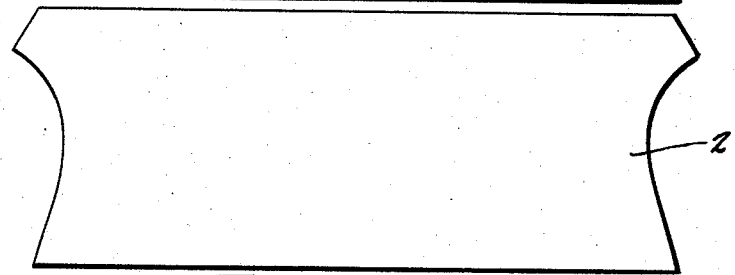
Fig. 2 illustrates a correspondingly cut or died-out lining for attachment thereto.
Figure 3:
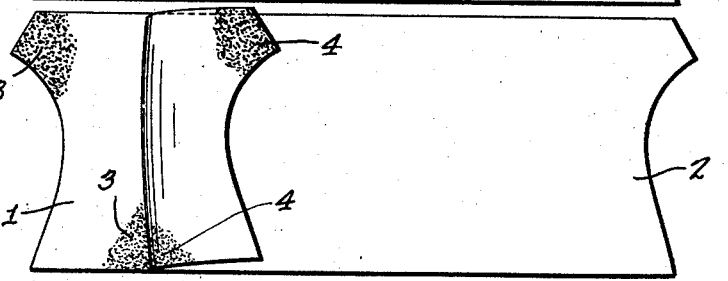
Fig. 3 illustrates the upper and lining united by adhesive.

As shown in the drawings, we have designated a died-out upper layer 1, and a corresponding lining 2 of suitable form and contour for attachment to each other, which is preferably done by adhesive coatings 3 and 4 on the faces of the upper 1 and lining 2, which are to be joined at the top and opposite edge portions only, leaving the counter part free of adhesive for subsequent insertion of the counter stiffener.

These upper and lining blanks are thus fitted together and slight pressure serves to unite them thru the cohesion of the adhesive coated surface.

Figure 4:
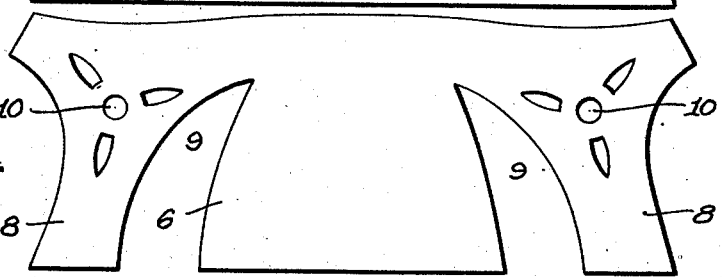
Fig. 4 illustrates the united upper and lining simultaneously died-out for the molded counter and unmolded quarter sections, together with cut-out ornamentations.
Figure 5:
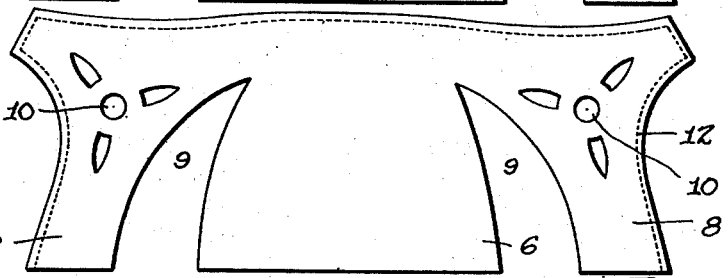
Fig. 5 shows the same with the marginal edge united by stitching.

With the blanks thus united, they are then subjected to a dieing-out operation, which, as illustrated in Fig. 4, will form the counter portion 6 and the quarters 8—8 by cutting-out sections, as shown at 9—9. During the same dieing-out operations, suitable ornamental cut-outs may be formed in the quarters or other portions, as shown at 10—10. With the blank as thus formed, a line of stitching 12 is then applied around the marginal edges of each quarter and the top of the upper, more firmly uniting the same and constituting a finishing stitching on this part of the blank.

The counter portion 6 is thus free to receive the counter stiffener 14 which, as shown in Fig. 6, is suitably formed to substantially fit the counter portion which is left by cutting out the section 9—9 from the combined upper and lining. The counter stiffener 14 is coated with adhesive on each face, as shown at 15 and 16, and the same is then applied to the counter portion between the upper 1 and the lining 2, whereupon stitching 18 is applied along the marginal edge of the free quarters 8 and across the shank stiffener, as indicated at 19, and also down the sides of the counter portion, as indicated at 20—20, thus firmly holding the shank stiffener within the pocket formed by the upper and lining.

With the blank as thus completed, the same may be subjected to pressure to more firmly unite the adhesive in the counter portion 6, whereupon all three layers constituting the counter structure are subjected to the molding action to form the same into the finished form of a counter contour, as indicated in Fig. 8, leaving the quarter sections 8—8 unmolded and free for subsequent lasting. The heel seat flange 21 is also formed and the insole 22 attached thereto, preferably by adhesive and pressure, or as described in our co-pending application Ser. No. 104,196.

With the blank as thus prepared, the same is then assembled on a last 25, see Fig. 10, whereupon the free quarters 8—8 are then lasted onto the insole 22 and secured as shown at 27 and 27 either by adhesive, or by staples 28, or otherwise.

While the heel seat flange 21 is attached to the insole 22 preferably before assembly and by adhesive to constitute a nailless heel seat construction, we may, if desired, secure additional fasteners 27—27 at the heel breast end of the flange 21, such fasteners being optional in the same manner as the staples 28 above explained, and indicated in the drawings, to aid in holding the lasted quarters 8. Any suitable and desirable forepart may be utilized, that as herein shown being sandal straps 30, 31, 32, 33, and 34, which also may be lasted and secured to the insole 22 by adhesive or by staples, or the like, one staple being illustrated at 35 on the toe strap 34.

With the construction as thus described, we have obtained the advantages of uniting the counter, upper, lining, and counter stiffener while flat, and thereupon molding these three layers simultaneously into finished contour for the shoe, while leaving the quarter sections unmolded for subsequent lasting and, hence, insuring better fitting of the quarters as the lasting operations draw the quarter sections firmly and smoothly against the wood of the last 25.

We believe our method of preparing and forming a counter and quarter blank, and thereafter dieing-out the same, molding the counter portion only, and subsequently lasting the quarter sections after assembly on a last is a distinct novelty in this art, and we wish to claim these several steps broadly.

We claim:

1. That improvement in the art of manufacturing boots and shoes, which consists in providing a blank for the counter and quarter portions of a shoe, cutting from said blank predetermined sections for the counter portion and for each quarter, fitting a counter stiffener in the counter portion, thereupon subjecting the same to the final molding action to form the counter portion into proper contour with an inturned flange to be attached to the insole, leaving the quarter portions unmolded, thereafter attaching the counter portion to the insole, and thereupon independently pulling over and lasting the unmolded portions of the quarter, and completing the shoe in any desired manner.

2. As an improved article of manufacture, a counter and quarter blank for use in making boots and shoes, comprising a counter portion, and independent quarter portions sufficiently separated from said counter portion to permit independent molding of the counter portion while leaving the quarter portions unmolded, said blank comprising upper and lining materials united together, and a counter stiffener fitted in said counter portion.

LESLIE L. HARTWELL, Jr.
BENJAMIN F. HARTWELL.
ARTHUR F. HARTWELL.